US008086764B2

(12) United States Patent
Kondo (10) Patent No.: US 8,086,764 B2
(45) Date of Patent: Dec. 27, 2011

(54) REMOTE USB DEVICE USAGE SYSTEM (75) Inventor: Katsuyoshi Kondo, Irvine, CA (US)

(73) Assignee: Sharp Kabushiki Kaisha, Osaka (JP)

( * ) Notice: Subject to any disclaimer, the term of this patent is extended or adjusted under 35 U.S.C. 154(b) by 299 days.

(21) Appl. No.: 12/454,353

(22) Filed: May 15, 2009

(65) Prior Publication Data

US 2009/0292833 A1 Nov. 26, 2009

(30) Foreign Application Priority Data

May 22, 2008 (JP) .................................. 2008-134741

(51) Int. Cl.
*G06F 3/00* (2006.01)
*H04L 12/28* (2006.01)
(52) U.S. Cl. ......................................... 710/18; 370/254
(58) Field of Classification Search .................... 710/18; 370/254
See application file for complete search history.

(56) References Cited

U.S. PATENT DOCUMENTS

| 6,895,588 | B1 * | 5/2005 | Ruberg ......................... 719/321 |
| 7,013,336 | B1 * | 3/2006 | King ............................. 709/224 |
| 2007/0011374 | A1 * | 1/2007 | Kumar et al. ................. 710/105 |
| 2008/0239990 | A1 * | 10/2008 | Ohara ........................... 370/254 |

FOREIGN PATENT DOCUMENTS

| JP | 2006-155067 | 6/2006 |
| JP | 2007-219711 | 8/2007 |

* cited by examiner

*Primary Examiner* — Henry Tsai
*Assistant Examiner* — Hyun Nam
(74) *Attorney, Agent, or Firm* — Edwards Wildman Palmer LLP; David G. Conlin; David A. Tucker (57) ABSTRACT

In one embodiment of a remote USB device usage system, when there is a request to connect to a remote USB device from any one of a plurality of applications, a check is performed of whether or not another application is using the remote USB device. When no application is using the remote USB device, connection to the remote USB device is performed. When there is a request to disconnect from a remote USB device from any one of a plurality of applications, a check is performed of whether or not another application is using the remote USB device, if no application is using the remote USB device, disconnection from the remote USB device is performed.

4 Claims, 8 Drawing Sheets

REMOTE USB DEVICE USAGE SYSTEM

CROSS-REFERENCE TO RELATED APPLICATION

This application claims priority under 35 U.S.C. §119(a) on Japanese Patent Application No. 2008-134741 filed in Japan on May 22, 2008, the entire contents of which are herein incorporated by reference.

TECHNICAL FIELD

The present invention relates to a remote USB device usage system that enables a client that has been connected to a network to which a server is connected to use a remote USB device that has been connected to that server.

BACKGROUND ART

An information processing apparatus such as a personal computer is ordinarily provided with a USB (Universal Serial Bus) interface, and a peripheral device compliant with USB interface specifications can be connected to the information processing apparatus and used.

Herein, a peripheral device compliant with USB interface specifications that is used by being directly connected to a USB interface provided in an information processing apparatus such as a personal computer is referred to as a direct USB device.

The above information processing apparatus such as a personal computer, other than the above USB interface, is ordinarily provided with a LAN interface whereby it is possible to communicate with another information processing apparatus that has been connected to a network such as a LAN (Local Area Network).

For example, JP 2007-219711A discloses a scheme in which by using a LAN interface, other than the above direct USB device, it is possible to use a peripheral device compliant with USB interface specifications that is connected to a server that has been connected to a LAN. JP 2007-219711A also describes a remote device control program in a scheme in which a USB device server has been deployed.

In a scheme in which an information processing apparatus such as a personal computer (referred to below as a client) that is connected to a network uses, via a network, a peripheral device compliant with USB interface specifications that connects to a server that has been connected to this network, herein, the peripheral device compliant with USB interface specifications that connects to this server is referred to as a remote USB device, viewed from a client that uses this peripheral device.

A USB device server that has been connected to a LAN enables a client (personal computer) that has been connected to a LAN to use a remote USB device that has been connected to this USB device server.

In this case, from the perspective of a client that has been connected to the LAN, a remote USB device behaves as if it is connected to the personal computer of the client itself. Therefore, an application loaded in the client, without being particularly aware of the network, is able to use that remote USB device in the same manner as a direct USB device.

However, in a system employing the above USB device server, in a client (personal computer) that uses a remote USB device, because this remote USB device behaves in the same manner as if a direct USB device that has been connected to the personal computer of the client itself, the following occurs.

When any of a plurality of units of application software (referred to below as applications) loaded in the client that uses a remote USB device requests connection to the remote USB device, the application is connected to the remote USB device and thus can use the remote USB device, and also, other applications loaded in the client can use this remote USB device.

However, when any of the plurality of applications using a remote USB device requests disconnection from the remote USB device, the remote USB device is disconnected, so another application that is using this remote USB device is also disconnected from the remote USB device even if currently using the remote USB device.

For example, when a client that uses a remote USB device has loaded two applications, specifically an application 1 and an application 2, even if there was a connection instruction from the application 1, the remote USB device can be used from the application 2, and when there is a disconnection instruction from the application 2, the application 1 also is then disconnected.

When a remote USB device is being used, for example, during data transmission employing communications with the remote USB device via a LAN, the transmission path is suddenly severed, so it becomes impossible to guarantee communications quality.

SUMMARY OF THE INVENTION

In order to avoid the sort of trouble described above, the present invention provides a remote USB device usage system in which a client that has been connected to a network to which a server is connected can use a remote USB device that is connected to the server, and when the client has loaded a plurality of applications, abrupt severing of the connection between the applications and the remote USB device is prevented.

In order to address the above problems, the remote USB device usage system of the invention is a remote USB device usage system in which a client that has been connected to a network to which a server is connected can use a remote USB device that is connected to the server. In this remote USB device usage system, the client has a remote USB device connection processing unit that is capable of connecting/disconnecting the remote USB device.

This remote USB device connection processing unit, when a request to connect to the remote USB device is made from any one of a plurality of applications provided by the client, performs a check of whether or not an application other than the application that made the connection request is already using the remote USB device, and when no application is using the remote USB device, connects to the remote USB device.

When a request to disconnect the remote USB device is made from any one of the plurality of applications, the remote USB device connection processing unit performs a check of whether or not an application other than the application that made the disconnection request is still using the remote USB device, and when no application is using the remote USB device, disconnects from the remote USB device According to the above remote USB device usage system, in the client, when a request is made to connect to the remote USB device from an application, the connection is performed if no applications are using the remote USB device, and when a request is made to disconnect the remote USB device, the disconnection is performed if no applications are using the remote USB device.

Accordingly, when the client has loaded a plurality of applications, it is possible to prevent abruptly severing the connection between these applications and the remote USB device.

In the above remote USB device usage system, the remote USB device connection processing unit has a counter that is set to 0 as an initial value, the counter being used to perform a check of whether or not the remote USB device is being used by an application.

The remote USB device connection processing unit increments the counter whenever a request to connect to the remote USB device is made by any one of the plurality of applications provided by the client, and decrements the counter whenever a request to disconnect the remote USB device is made by any one of the plurality of applications provided by the client.

The above remote USB device connection processing unit, when the counter changes from 0 to 1, judges that no application is using the remote USB device and connects to the remote USB device, and when the counter changes from 1 to 0, judges that no application is using the remote USB device and disconnects from the remote USB device.

By adopting such a configuration, it is possible to accurately and quickly perform connection to or disconnection from the remote USB device.

Alternatively, in the above remote USB device usage system, the remote USB device connection processing unit may perform the following sort of processing.

Whenever a request to connect to the remote USB device is made by any one of the plurality of applications provided by the client, the remote USB device connection processing unit stores application identification information that identifies the application that made the connection request.

Also, whenever a request to disconnect the remote USB device is made by any one of the plurality of applications provided by the client, the remote USB device connection processing unit extracts and deletes, from among the application identification information that has been stored, the application identification information that identifies the application that made the disconnection request.

When the identification information is initially stored, the remote USB device connection processing unit judges that no application is using the remote USB device and performs connection to the remote USB device. As the method of judging whether or not the identification information was initially stored, for example, it is possible to detect whether there is one unit of application identification information stored.

Alternatively, when all of the identification information has been deleted, the remote USB device connection processing unit judges that no application is using the remote USB device and disconnects from the remote USB device. As the method of judging whether or not all of the identification information has been deleted, for example, it is possible to detect when there has become zero units of application identification information stored.

Thus, it is possible to accurately and quickly perform connection to or disconnection from the remote USB device.

The above remote USB device usage system can be configured using a multifunction peripheral having at least one of a copy function, a scan function, a print function, or a facsimile function as the above server. In this case, for example, a USB memory, a card reader, or the like that has been connected to the multifunction peripheral via USB may serve as the remote USB device.

Thus, when the client has loaded a plurality of applications, it is possible to prevent abruptly severing the connection between these applications and the remote USB device.

BEST MODE FOR CARRYING OUT THE INVENTION

Hereinafter, a remote USB device usage system that is an example of the present invention will be described with reference to the accompanying drawings.

<Overall Description>

Figure 1:
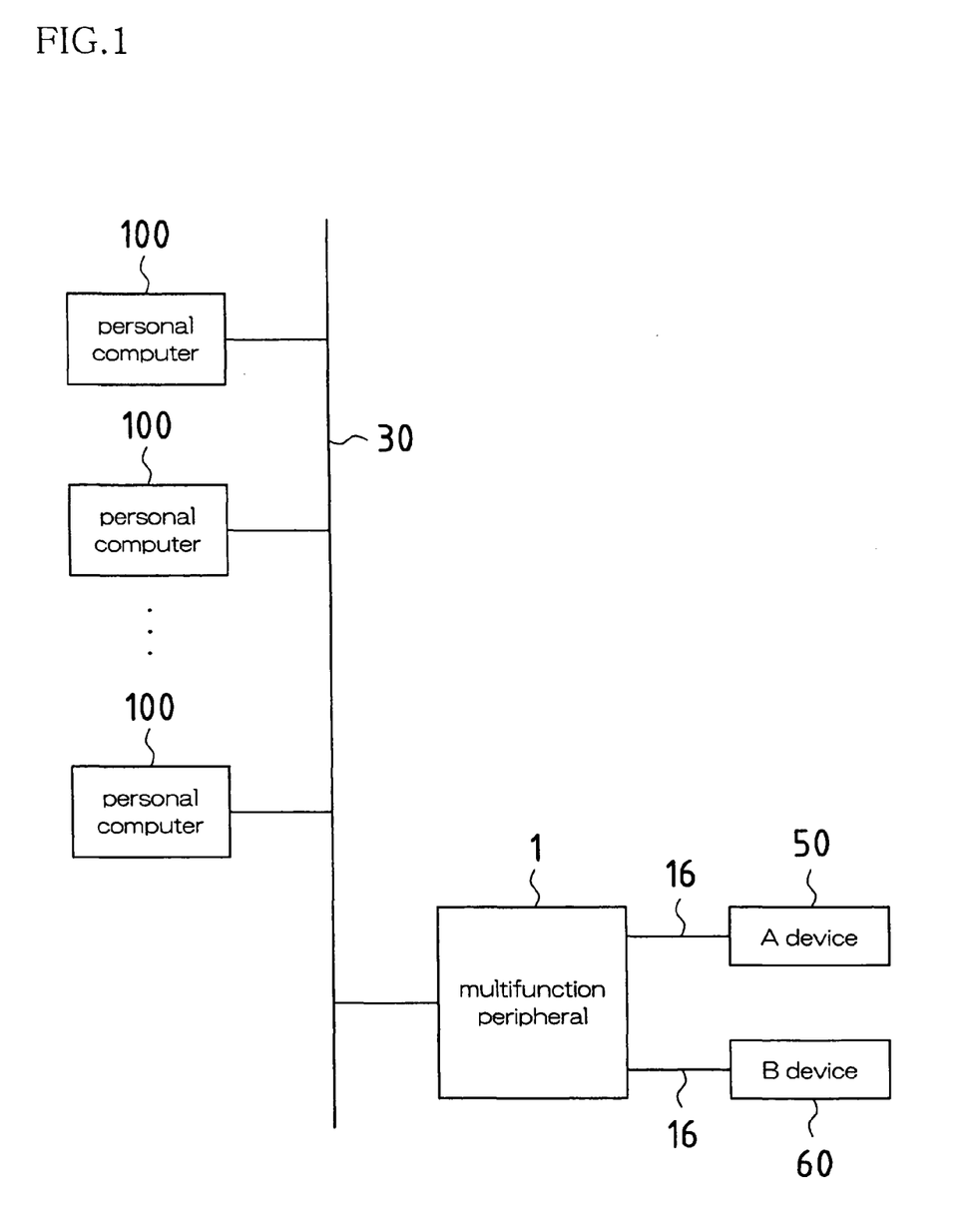
FIG. 1 is a block diagram that shows the configuration of a remote USB device usage system in the present embodiment.

In FIG. 1, the remote USB device usage system in the present embodiment is configured with a plurality of personal computers 100, a digital multifunction peripheral 1, an A device 50, and a B device 60.

The plurality of personal computers 100 are connected to the digital multifunction peripheral 1 via a LAN (Local Area Network) 30, and the A device 50 and the B device 60 are each connected to the digital multifunction peripheral 1 via a USB (Universal Serial Bus) 16.

The remote USB device usage system is a system in which the personal computers 100 (corresponding to the aforementioned client) that have been connected to the LAN 30, which is a network to which the digital multifunction peripheral 1 is connected, can use the A device 50 and the B device 60 (corresponding to the aforementioned remote USB devices) that have been connected to the digital multifunction peripheral 1 (corresponding to the aforementioned server).

Next is a description of the personal computers 100, the digital multifunction peripheral 1, the A device 50, and the B device 60 that make up the remote USB device usage system.

<Description of Personal Computers>

Figure 2:
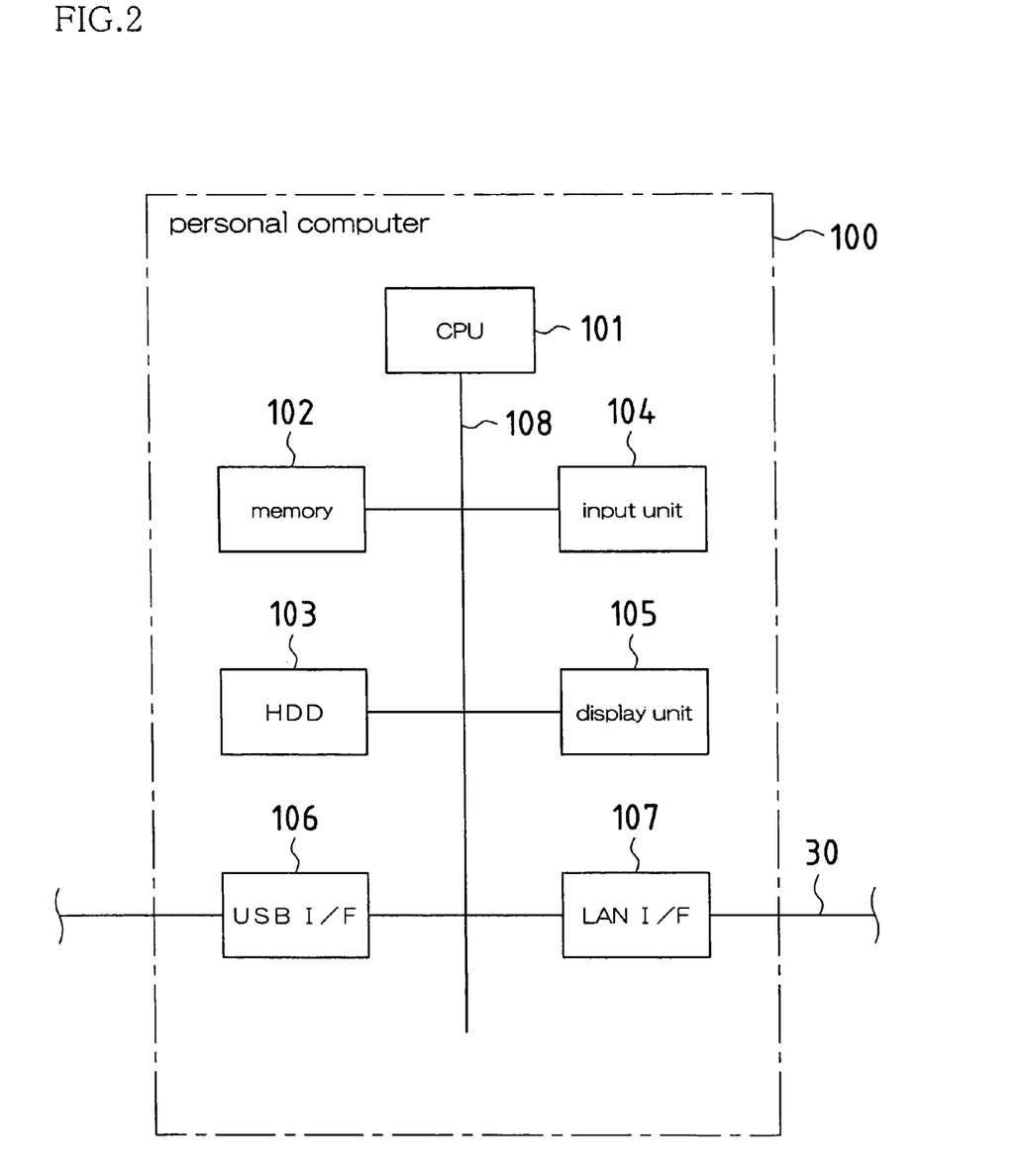
FIG. 2 is a block diagram that shows the configuration of a personal computer of the remote USB device usage system in the present embodiment.

FIG. 2 is a block diagram that shows the configuration of a personal computer 100. In FIG. 2, the personal computer 100 is configured with a CPU 101, a memory 102, a hard disk (HDD) 103, an input unit 104, a display unit 105, a USB interface 106, and a LAN interface 107. The CPU 101, the memory 102, the hard disk (HDD) 103, the input unit 104, the display unit 105, the USB interface 106, and the LAN interface 107 are connected to each other via an internal bus line 108.

The CPU 101 is configured with a microprocessor. The memory 102 is configured with a RAM, a flash memory, or the like. In the HDD 103, software such as an OS (Operating System) necessary for controlling the personal computer 100 and various process programs are stored. The CPU 101 performs various processes in the personal computer 100 with the software loaded in the HDD 103.

A keyboard, a mouse, and so forth are provided in the input unit 104, and are used for performing various settings, input of information, and the like to the personal computer 100. The display unit 105 displays information or the like that has been output from the personal computer 100.

The USB interface 106 is an interface circuit for connecting to an external apparatus using USB. This external apparatus that is connected to the USB interface 106 via USB is referred to as a direct USB device, viewed from the personal computer 100.

The LAN interface 107 is an interface circuit for connecting to a LAN. As described above, the personal computer 100 is connected to the digital multifunction peripheral 100 via this LAN. Also, using this LAN interface 107, it is possible for the personal computer 100 to connect to the Internet via a LAN.

<Digital Multifunction Peripheral>

Figure 3:
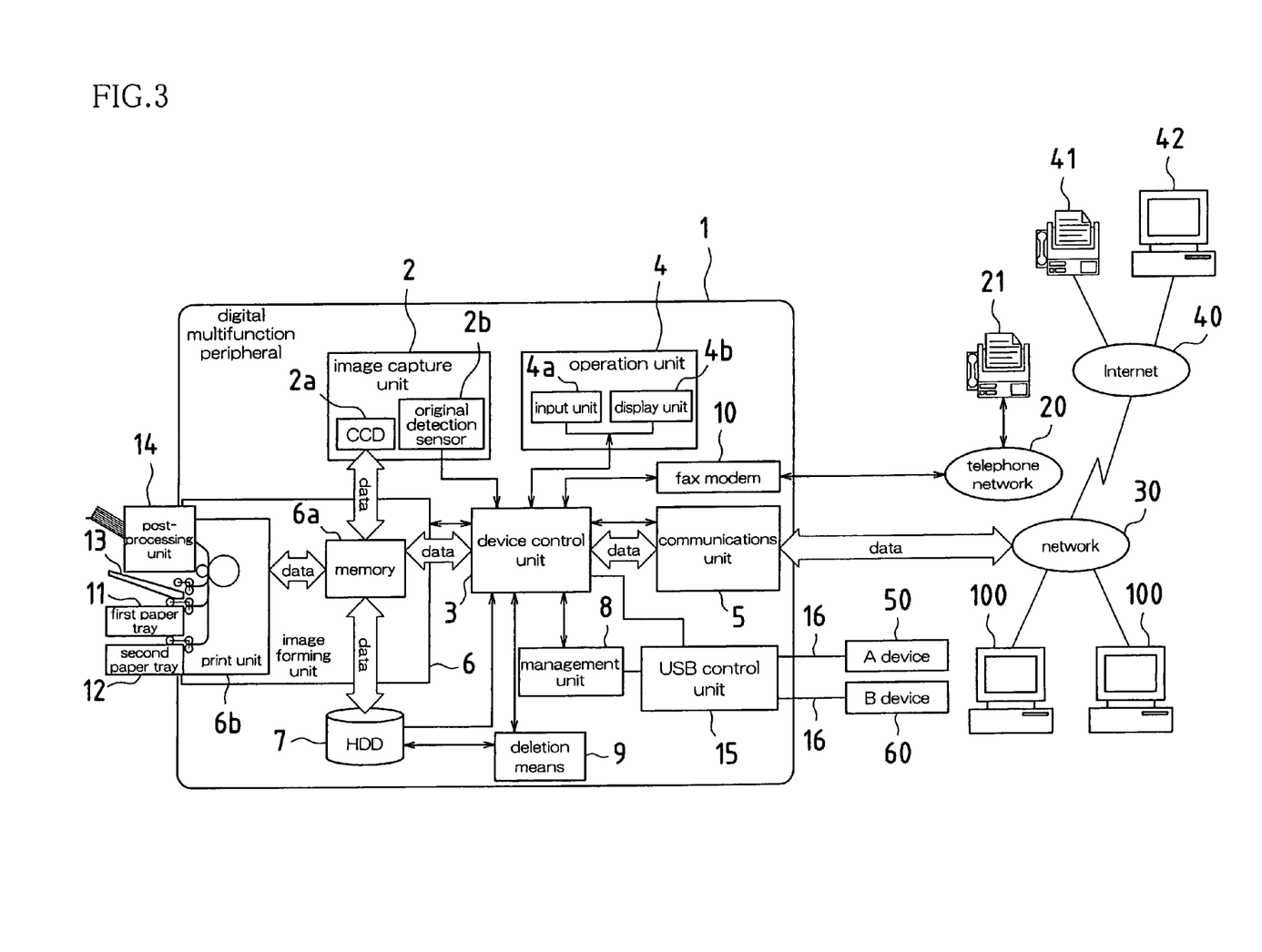
FIG. 3 is a block diagram that shows the configuration of a digital multifunction peripheral of the remote USB device usage system in the present embodiment.

FIG. 3 is a block diagram that shows the configuration of the digital multifunction peripheral 1. FIG. 3 shows a telephone network 20, a facsimile apparatus 21 connected to this telephone network 20, a network 30 connected to the aforementioned LAN, personal computers 100 as described above connected to the network 30, an Internet 40, a facsimile apparatus 41 connected to the Internet 40, a terminal apparatus 42 connected to the Internet 40, and so forth.

The digital multifunction peripheral 1 enables sending/receiving of image data by fax between the facsimile apparatuses 21 and 41, and enables sending/receiving via the LAN (network) 30 between the terminal apparatus 42 and the personal computers 100. Note that the telephone network 20, the Internet 40, the facsimile apparatuses 21 and 41, and the terminal apparatus 42 are omitted from above FIG. 1.

Also, the digital multifunction peripheral 1 is provided with a plurality of functions, namely a scanner function, a copy function, a facsimile function, and a printer function.

Next is a description of the configuration of the digital multifunction peripheral 1. The digital multifunction peripheral 1 in FIG. 3 is configured with an image capture unit 2, an operation unit 4, an image forming unit 6, an HDD 7, a post-processing unit 14, a device control unit 3, a communications unit 5, a management unit 8, a deletion means 9, a fax modem 10, and a USB control unit 15.

Next is a description of the parts of the digital multifunction peripheral 1 shown in FIG. 3. First, the image capture unit 2 is an input means that captures an original and inputs image data. The image capture unit 2 is, for example, provided with a CCD (Charge Coupled Device) 2a as an image capturing means and an original detection sensor 2b that detects an original that has been placed on an original platen, in an automatic document feeder (ADF), or the like.

The operation unit 4 is provided with an input unit 4a having various input keys or the like, and a display unit 4b such as an LCD (Liquid Crystal Display), and performs input of operation and various settings to the digital multifunction peripheral 1.

Also, an authentication information input means that inputs authentication information of a user who uses the digital multifunction peripheral 1 may be disposed in the input unit 4a. Various methods of inputting user authentication information may be adopted, such as, for example, directly inputting a user code, input by reading ID card information, or input by reading user biometric information (such as a fingerprint). User authentication of the digital multifunction peripheral 1 can be performed by any of these methods.

Also, from the operation unit 4, the user can perform an interrupt instruction for pausing a currently recording job and interrupting with another job.

The image forming unit 6 is a data processing (output) means that processes (outputs) image data, and is provided with a memory 6a that is a page memory, a print unit 6b such as an LSU (Laser Scanning Unit), and a first paper tray 11, a second paper tray 12, and a manual feed paper tray 13 that store recording paper and supply recording paper to the print unit 6b.

In the image forming unit 6, image data that has been temporarily stored in the memory 6a is stored in the HDD 7, or image data stored in the HDD 7 is decoded and sent to the memory 6a, transferred to the print unit 6b and output by printing to recording paper. The print unit 6b of the image forming unit 6 is provided with a duplex printing function, so printing can be performed not only to the front side of recording paper, but also to the back side, as necessary.

The HDD 7 is a storage means for temporarily storing image data that has been input. By configuring the HDD 7 as a storage means provided with a magnetic storage medium, it is possible to accumulate and sequentially process a large amount of image data, and so it is possible to effectively process instructions from a plurality of users.

After printing to recording paper with the image forming unit 6 is finished, the post-processing unit 14 folds, binds, and staples that printed recording paper as necessary, and stores the processed recording paper in a storage tray of the post-processing unit 14.

The device control unit 3 controls the functions provided in the digital multifunction peripheral 1. The communications unit 5 communicates with the personal computers 100 via the LAN 30, and communicates with the facsimile apparatus 41 and the terminal apparatus 42 via the Internet 40. The management unit 8 is a memory that stores control information, settings information, and so forth of the digital multifunction peripheral 1. The deletion means 9 deletes image data in the HDD 7. The fax modem 10 communicates with the facsimile apparatus 21 via the telephone network 20.

The USB control unit 15 is an interface circuit for connecting to an external apparatus using a USB 16. As described above, the A device 50 and the B device 60 are each connected to the digital multifunction peripheral 1 via a USB 16. A USB memory or a card reader, for example, is used as the A device 50 or the B device 60.

Next is a simple description of example operations related to image processing modes loaded by the digital multifunction peripheral 1.

(Copy Mode)

The copy mode is a mode in which the above copy function in the digital multifunction peripheral 1 is executed. In the copy mode, in the digital multifunction peripheral 1, image data of an original that has been captured with the image capture unit 2 is output as a copy from the image forming unit 6.

In the image capture unit 2, the CCD 2a is provided, and an image of an original that has been placed at a capture position can be electronically captured. The image data of the captured original is completed as output data in the memory 6a, and is temporarily stored to the HDD 7. When there are a plurality of originals, the operations of capture and storage are repeated. Afterward, based on the processing mode that has been instructed from the operation unit 4, the image data that has been stored in the HDD 7 is sequentially read out at an appropriate timing and sent to the memory 6a. Then, in synch with write timing to the print unit 6b, the image data is transferred from the memory 6a to the print unit 6b.

Also, when printing a plurality of pages of captured image data, the image data is likewise stored in the HDD 7 in single page units as output data and sent from the HDD 7 to the memory 6a according to the output mode, operation is repeated for the number of output pages, and the image data is transferred to the print unit 6b in synch with the write timing to the print unit 6b.

In the print unit 6b, images, text, and so forth are printed to recording paper (corresponding to the above-described image forming), and this printed recording paper is transported to the post-processing unit 14. The post-processing unit 14 folds, binds, and staples printed recording paper that has been transported to the post-processing unit 14 as necessary, and stores the processed recording paper in a storage tray of the post-processing unit 14.

(Printer Mode)

The printer mode is a mode in which the above printer function in the digital multifunction peripheral 1 is executed. In the printer mode, in the digital multifunction peripheral 1, image data received from the communications unit 5 is output from the image forming unit 6 via the memory 6a and so forth.

The communications unit 5 is connected to the network 30 in a wired or wireless manner, and receives image data from the personal computers 100, which are external devices that have been connected on the network 30. Image data that has been received in this manner is sent to the memory 6a in single page units as image data to be output, and is temporarily stored in the HDD 7. The image data is again sent from the HDD 7 to the memory 6a, and is transferred to the print unit 6b, same as in the above case of using the digital multifunction peripheral 1 as a copier.

In the print unit 6b, images, text, and so forth are printed to recording paper, and this printed recording paper is transported to the post-processing unit 14. The post-processing unit 14 folds, binds, and staples printed recording paper that has been transferred to the post-processing unit 14 as necessary, and stores the processed recording paper in a storage tray of the post-processing unit 14.

(Scanner Mode)

The scanner mode is a mode in which the above scanner function in the digital multifunction peripheral 1 is executed. In the scanner mode, in the digital multifunction peripheral 1, the image data of the original that has been captured in the image capture unit 2 can be sent from the communications unit 5 to a desired personal computer 100 via the network 30. Here as well, the original is electronically captured by a CCD 2a provided in the image capture unit 2. The captured original image data is completed as output data in the memory 6a, and temporarily stored to the HDD 7. Then, the output data is again sent from the HDD 7 to the memory 6a, and after establishing communications with a send destination instructed via the operation unit 4, the output data is sent from the communications unit 5 to an intended send destination.

(Facsimile Mode)

The facsimile mode is a mode in which the above facsimile function in the digital multifunction peripheral 1 is executed. In the facsimile mode, in the digital multifunction peripheral 1, the fax modem 10 is used, the fax modem 10 being connected to the communications unit 5 that is connected to the facsimile apparatus 41 via the network 30 and the Internet 40, or connected to the facsimile 21 via the telephone network 20.

The constituent parts of the above digital multifunction peripheral 1 are controlled by the device control unit 3 shown in FIG. 3. This control is performed by a microprocessor CPU that constitutes the device control unit 3, and an OS (Operating System) and various software that are stored in the hard disk (HDD) 7.

Also, the device control unit 3 monitors operation instructions from the input unit 4a that has keys or the like and is provided in the operation unit 4, and via the display unit 4b, accurately guides/displays information to be provided to a user such as information related to the state of the digital multifunction peripheral 1.

Also, the management unit 8 shown in FIG. 3 manages information related to each constituent part controlled by the device control unit 3, and based on the information that the management unit 8 manages, the device control unit 3 controls overall operation of the digital multifunction peripheral 1.

As described above, the A device 50 and the B device 60 are connected to the digital multifunction peripheral 1 via USB. As described above, a USB memory or a card reader is used as the A device 50 or the B device 60.

Hardware necessary for each device such as a microprocessor CPU and a USB interface, and software are provided in the A device 50 and the B device 60. Because the A device 50 and the B device 60 are connected to the digital multifunction peripheral 1 via the USBs 16, viewed from the digital multifunction peripheral 1, the A device 50 and the B device 60 can be said to be direct USB devices, as described above. That is, the A device 50 or the B device 60 is ordinarily used by the digital multifunction peripheral 1 as an external apparatus of the digital multifunction peripheral 1.

However, in the remote USB device usage system, as described above, the A device 50 and the B device 60 (corresponding to the aforementioned remote USB devices) connected to the digital multifunction peripheral 1 (corresponding to the aforementioned server) can be used also from a personal computer 100 (corresponding to the aforementioned client) that has been connected to the LAN 30 to which the digital multifunction peripheral 1 is connected. In this case, the A device 50 and the B device 60 are referred to as remote USB devices, viewed from the personal computer 100. However, in the below description, these remote USB devices are referred to simply as devices.

In this remote USB device usage system, the personal computer 100 can use the A device 50 and the B device 60 connected to the digital multifunction peripheral 1 via the USB 16 as if the A device 50 and the B device 60 are direct USB devices that have been connected to the USB interface 106 of that personal computer 100 via USB.

<Specific Description of Remote USB Device Usage System>

Next is a specific description of, in the remote USB device usage system shown in FIG. 1, a scheme in which the A device 50 and the B device 60 connected to the digital multifunction peripheral 1 are used from a personal computer 100. This scheme is realized with software in the personal computer 100, the digital multifunction peripheral 1, the A device 50, and the B device 60, respectively having the hardware described above. In the remote. USB device usage system in this embodiment, two items of application software, specifically a first application and a second application, are loaded as application software that has been loaded in the personal computer 100 that uses the A device 50 or the B device 60.

Figure 4:
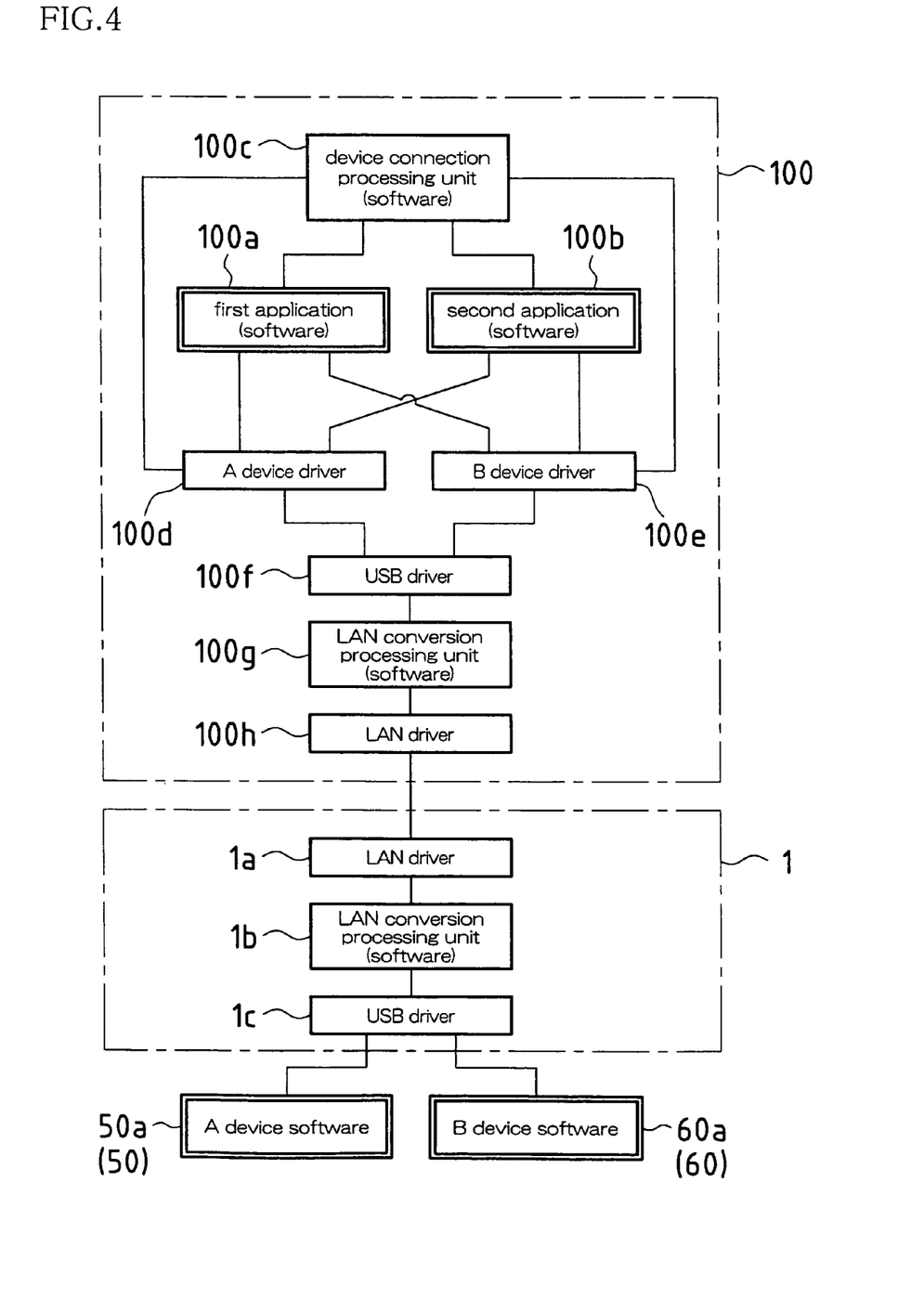
FIG. 4 is a configuration diagram that shows the main software configuration of the remote USB device usage system in the present embodiment.

FIG. 4 is a configuration diagram that shows the main software configuration for realizing the above scheme in the personal computer 100, the digital multifunction peripheral 1, the A device 50, and the B device 60 of the remote USB device usage system. The above scheme is realized by these items of software cooperating under the OS (Operating System) loaded in each of the personal computer 100 and the digital multifunction peripheral 1.

In FIG. 4, the configuration of software in the remote USB device usage system is as follows. First, the personal computer 100 is configured with a first application 100a, a second application 100b, a device connection processing unit 100c, an A device driver 100d, a B device driver 100e, a USB driver 100f, a LAN conversion processing unit 100g, and a LAN driver 100h.

The digital multifunction peripheral 1 is configured with a LAN driver 1a, a LAN conversion processing unit 1b, and a USB driver 1c. Also, an A device software 50a is loaded in the A device 50, and a B device software 60a is loaded in the B device 60.

The first application 100a and the second application 100b that are loaded in the personal computer 100, as described above, are items of application software that use the A device 50 or the B device 60. The device connection processing unit 100c is software that performs a process for connecting to the A device 50 or the B device 60, in order for the first application 100a or the second application 100b to use the A device 50 or the B device 60.

The A device driver 100d, the B device driver 100e, the USB driver 100f, and the LAN driver 100h are driver software of, respectively, the A device 50, the B device 60, the USB interface 106 of the personal computer 100, and the LAN interface 107 of the personal computer 100.

The LAN conversion processing unit 100g, between the USB driver 100f and the LAN driver 100h, capsulates output of the A device driver 100d or the B device driver 100e that is output via the USB driver 100f, and transfers that output to the LAN driver 100h. Also, the LAN conversion processing unit 100g transfers the capsulated output of the A device 50 or the B device 60 from the LAN driver 100h to the A device driver 100d or the B device driver 100e via the USB driver 100f.

That is, control information and data that flows through the USB to the A device 50 or the B device 60, or control information or data that flows through the USB from the A device 50 or the B device 60, is capsulated and incorporated in the information that flows through the LAN 30 by the LAN driver 100h, and transmitted between the personal computer 100 and the digital multifunction peripheral 1.

Accordingly, the LAN driver 1a, the LAN conversion processing unit 1b, and the USB driver 1c loaded in the digital multifunction peripheral 1 also perform the same sort of processing as the above USB driver 100f, LAN conversion processing unit 100g, and LAN driver 100h.

Next is a description of operation in the above remote USB device usage system when, for example, the first application 100a of the personal computer 100 uses the A device 50.

When the first application 100a uses the A device 50, first, a process of connecting to the A device 50 is started by a request to connect to the A device 50 to the device connection processing unit 100c of the personal computer 100 being submitted from the first application 100a of the personal computer 100.

By the device connection processing unit 100c of the personal computer 100 providing information necessary for connection to the A device driver 100d, this information is communicated to the digital multifunction peripheral 1 via the USB driver 100f, the LAN conversion processing unit 100g, and the LAN driver 100h of the personal computer 100, and is communicated to the A device 50 via the LAN driver 1a, the LAN conversion processing unit 1b, and the USB driver 1c of the digital multifunction peripheral 1.

Then, a reply of the A device 50 is communicated to the device connection processing unit 100c of the personal computer 100 by a route opposite to that described above, and thus a link is established between the personal computer 100 and the A device 50.

When a link is once established between the personal computer 100 and the A device 50 in this manner, thereafter, data can be directly sent/received between an application of the personal computer 100 and the A device 50, without intervention of the device connection processing unit 100c of the personal computer 100. That is, in the above example, data can be directly sent/received between the first application of the personal computer 100 and the A device 50, without intervention of the device connection processing unit 100c of the personal computer 100.

Severing of the link between the personal computer 100 and the A device 50 is performed in the same manner as the link establishment described above. That is, when severing the link, for example, a process of severing the link to the A device 50 is started by submitting a request to sever the link to the A device 50 from the first application 100a of the personal computer 100 to the device connection processing unit 100c of the personal computer 100.

Above, a case is described in which the first application 100a of the personal computer 100 uses the A device 50, but similar processing is performed when the first application 100a uses the B device 60, or when the second application 100b uses the A device 50, or when the second application 100b uses the B device 60.

Also, in the above remote USB device usage system, while one particular application is using a particular device, another application can also use the same device.

In this case, when any of a plurality of applications that are using that device makes a request to disconnect from that device, the device will be disconnected even if another application is presently using the device. Therefore, a scheme such that this sort of situation does not occur is provided in the device connection processing unit 100c.

Next is a description of operation by the device connection processing unit 100c provided with the above scheme. Two types of operation, specifically a first operation and a second operation, are included in the operation by this device connection processing unit 100c. Either one of the first operation and the second operation of the device connection processing unit is actually used.

Figure 5:
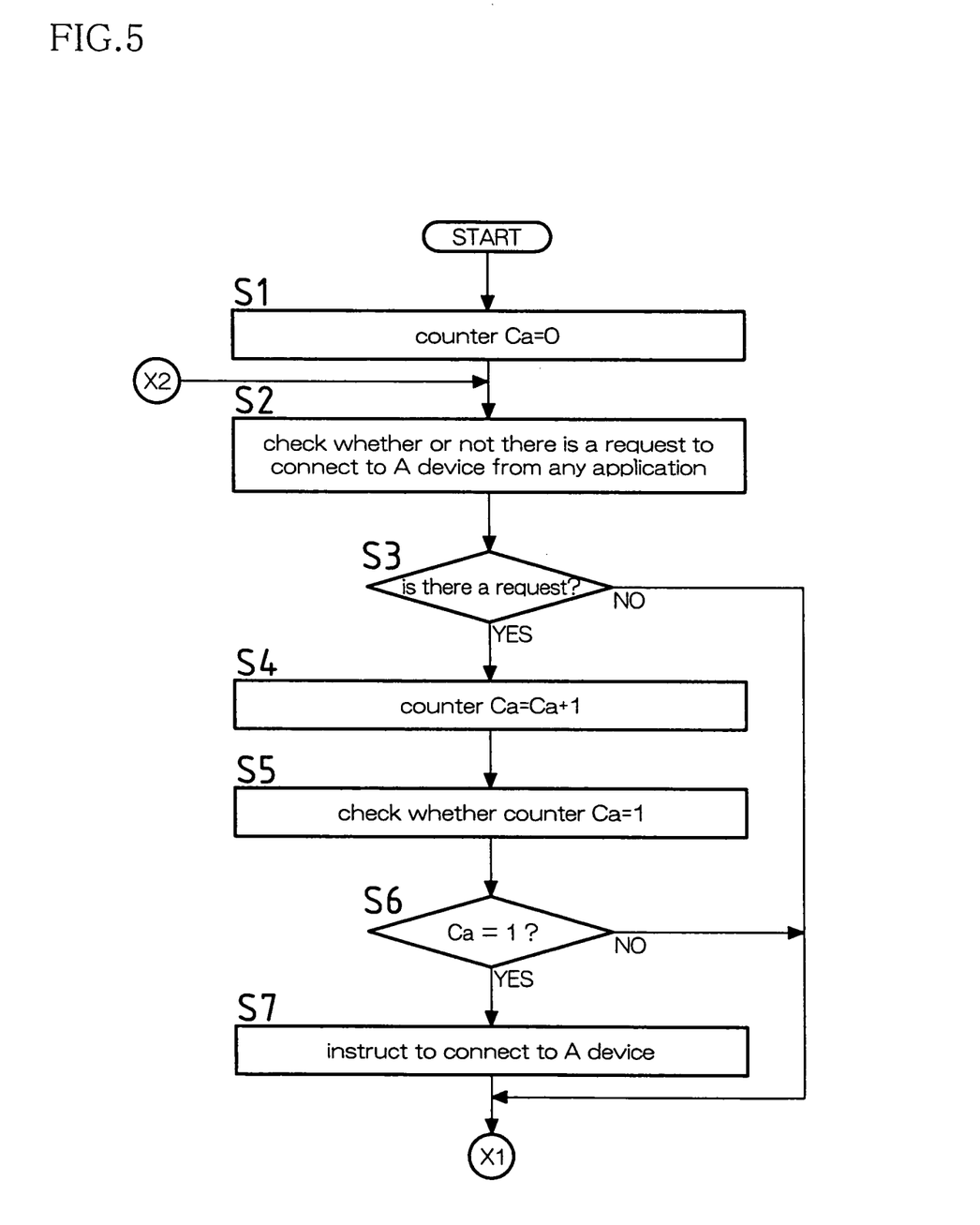
FIG. 5 is a flowchart (1 of 2) that shows a first operation of a device connection processing unit of the remote USB device usage system in the present embodiment.
Figure 6:
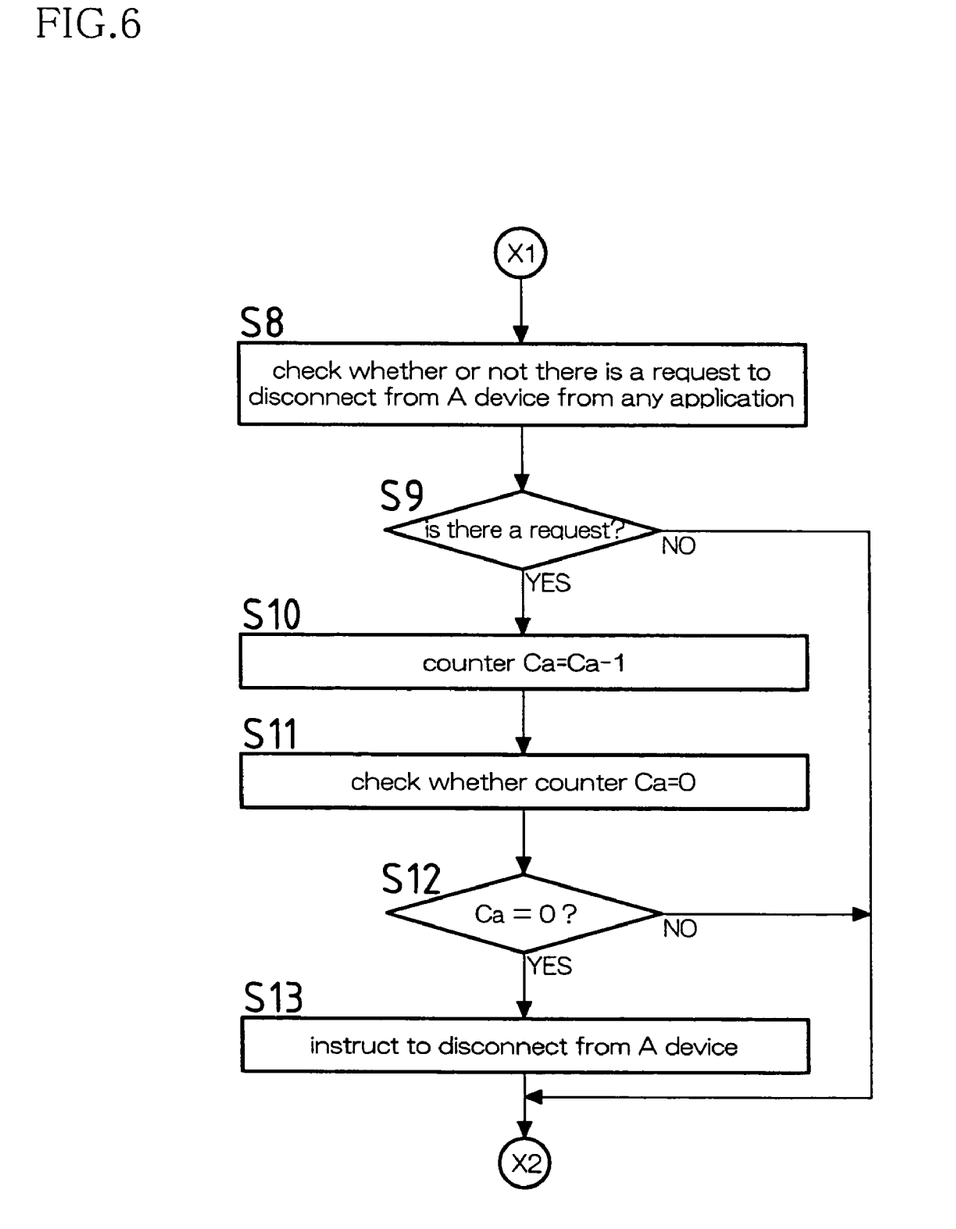
FIG. 6 is a flowchart (2 of 2) that shows the first operation of the device connection processing unit of the remote USB device usage system in the present embodiment.

First, the first operation of the device connection processing unit will be described. FIGS. 5 and 6 are flowcharts that show the first operation of the device connection processing unit. In this first operation of the device connection processing unit, in order to perform processing of the above scheme, a counter that is counted in software is provided for all of the devices (remote USB devices) that are connected to the digital multifunction peripheral 1, corresponding to each of the devices.

In the above remote USB device usage system, a counter Ca for the A device 50 and a counter Cb for the B device 60 are used. The flowcharts shown in FIGS. 5 and 6 relate to a case where the A device 50 is used as a device.

Next, the first operation of the device connection processing unit in a case where the A device 50 is used as a device will be described based on FIGS. 5 and 6. First, the counter Ca is reset (S1). Next, a check of whether there is a request to connect to the A device 50 from any application is performed (S2), and if there is no connection request (S3), the routine proceeds to S8.

In S2, in the check of whether there is a request to connect to the A device 50 from any application, if there is a connection request (S3), then the counter Ca is incremented (S4), next a check of whether or not the counter Ca=1 is performed (S5), and if the counter Ca≠1 (S6), the routine proceeds to S8.

In S5, a check of whether or not the counter Ca=1 is performed, and if the counter Ca=1 (S6), then connection to the A device is instructed (S7), and the routine proceeds to S8.

In S8, a check of whether there is a request to disconnect the A device 50 from any application is performed, and if there is no disconnection request (S9), the routine proceeds to S2 and the processing from S2 onward is repeated.

In S8, in the check of whether there is a request to disconnect the A device 50 from any application, if there is a disconnection request (S9), then the counter Ca is decremented (S10), next a check of whether or not the counter Ca=0 is performed (S11), and if the counter Ca≠0 (S12), the routine proceeds to S2 and the processing from S2 onward is repeated.

In S11, a check of whether or not the counter Ca=1 is performed, and if the counter Ca=0 (S12), then disconnection from the A device is instructed (S13), and the routine proceeds to S2 and the processing from S2 onward is repeated.

Above, the first operation of the device connection processing unit in a case where the A device 50 is used is described. However, the first operation of the device connection processing unit in a case where the B device 60 is used is the same as the processing described above.

Figure 7:
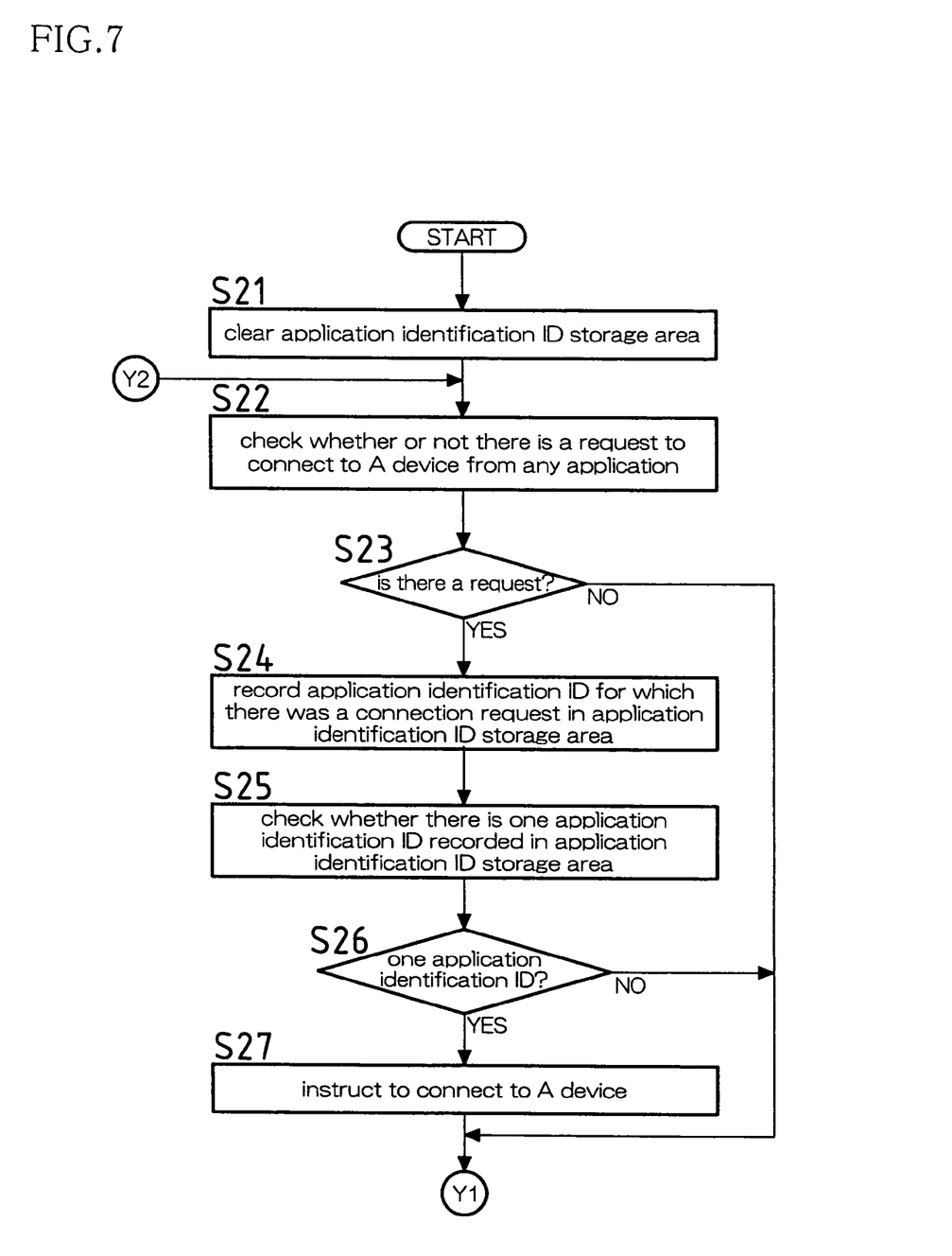
FIG. 7 is a flowchart (1 of 2) that shows a second operation of the device connection processing unit of the remote USB device usage system in the present embodiment.
Figure 8:
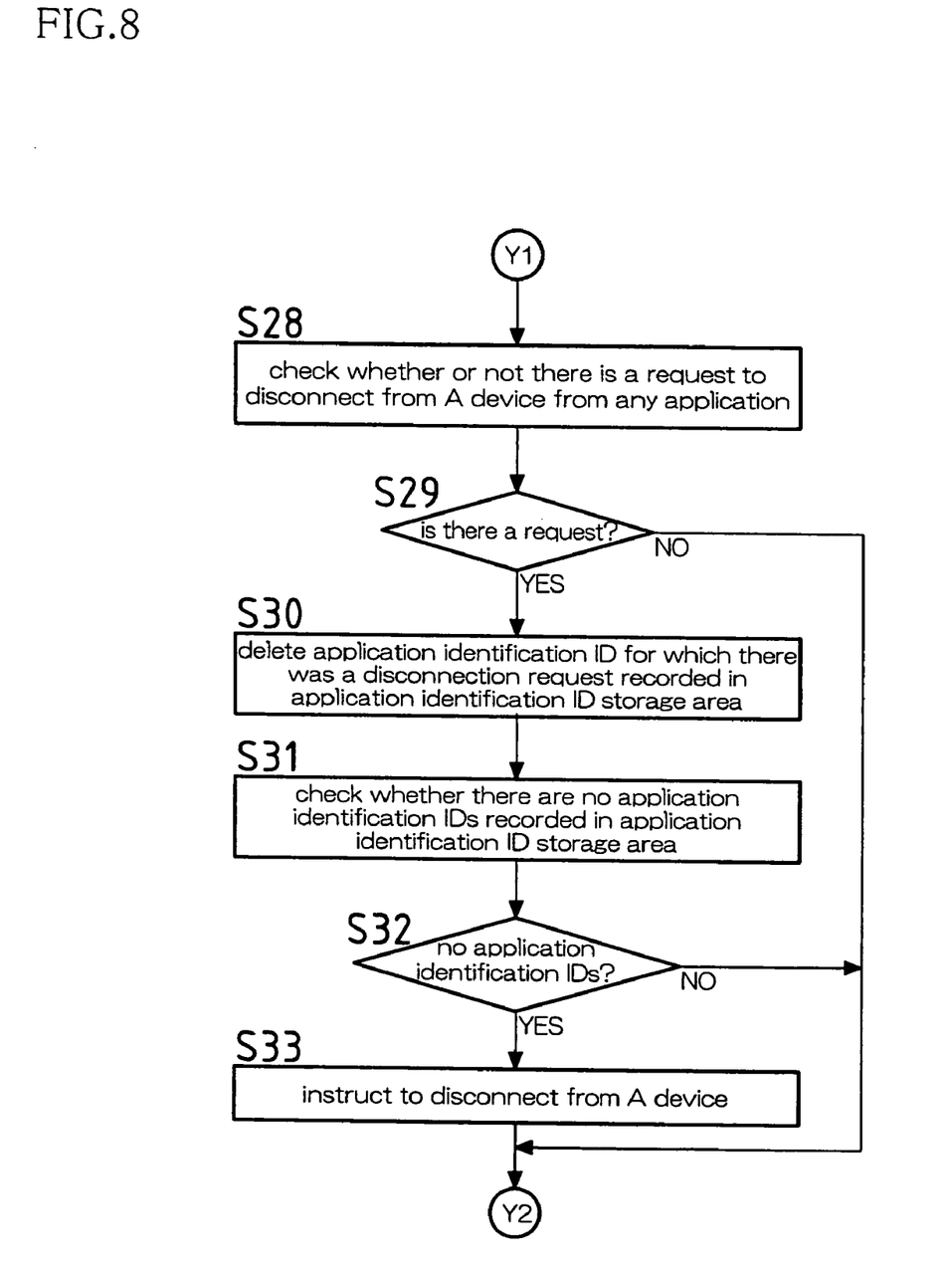
FIG. 8 is a flowchart (2 of 2) that shows the second operation of the device connection processing unit of the remote USB device usage system in the present embodiment.

Next, the second operation of the device connection processing unit will be described. FIGS. 7 and 8 are flowcharts that show the second operation of the device connection processing unit. In this second operation of the device connection processing unit, in order to perform processing of the above scheme, with an application loaded in the personal computer 100, an application identification ID is attached to all applications that use a device (remote USB device) that is connected to the digital multifunction peripheral 1. Also, an application identification ID storage area for recording this application identification ID is secured. This application identification ID storage area is provided for all of the devices (remote USB devices) that are connected to the digital multifunction peripheral 1, corresponding to each of the devices.

Next, the second operation of the device connection processing unit in a case where the A device 50 is used will be described with reference to FIGS. 7 and 8. First, the application identification ID storage area is cleared (S21). Next, a check of whether there is a request to connect to the A device 50 from any application is performed (S22), and if there is no connection request (S23), the routine proceeds to S28.

In S22, in the check of whether there is a request to connect to the A device 50 from any application, if there is a connection request (S23), then the application identification ID for which there was a connection request is stored in an application identification ID storage area (S24). Next a check of whether or not there is one application identification ID stored in the application identification ID storage area is performed (S25), and if not one application identification ID (S26), the routine proceeds to S28.

In the check in S25 of whether or not there is one application identification ID stored in the application identification ID storage area, if one application identification ID (S26), then connection to the A device is instructed (S27), and the routine proceeds to S28.

In S28, a check of whether there is a request to disconnect the A device 50 from any application is performed, and if there is no disconnection request (S29), the routine proceeds to S22 and the processing from S22 onward is repeated.

In the check in S28 of whether there is a request to disconnect the A device 50 from any application, if there is a disconnection request (S29), next the application identification ID for which there was a disconnection request that is stored in the application identification ID storage area is deleted (S30). Then, a check of whether or not there is no application identification ID stored in the application identification ID storage area is performed (S31), and if not no application identification ID (S32), the routine proceeds to S22, and the processing from S22 onward is repeated.

In the check in S31 of whether or not there is no application identification ID stored in the application identification ID storage area, if no application identification ID (S32), then disconnection from the A device is instructed (S33), the routine proceeds to S22, and the processing from S22 onward is repeated.

Above, the second operation of the device connection processing unit in a case where the A device 50 is used is described. However, the second operation of the device connection processing unit in a case where the B device 60 is used is the same as the processing described above.

According to the remote USB device usage system in the above embodiment, in the personal computer 100, when a request has been made from the first application 100a or the second application 100b loaded in the personal computer 100 to connect to the A device 50 or the B device 60 connected to the digital multifunction peripheral 1, when neither the first application 100a or the second application 100b is using that device, connection is performed.

When a request has been made from the first application 100a or the second application 100b to disconnect that device, when neither the first application 100a or the second application 100b is using that device, disconnection is performed.

Accordingly, in a remote USB device usage system in which the personal computer 100 connected to the LAN 30 to which the digital multifunction peripheral 1 is connected can use the A device 50 or the B device 60 connected to the digital multifunction peripheral 1, when the personal computer 100 has loaded a plurality of applications, it is possible to prevent abruptly severing the connection between these applications and the A device 50 or the B device 60 connected to the digital multifunction peripheral 1.

In the remote USB device usage system of the above embodiment, two applications, specifically the first application 100a and the second application 100b, are used as applications that have been loaded in the personal computer 100, but two or more applications may be loaded, or only one application may be loaded.

Also, in the remote USB device usage system of the above embodiment, two devices, specifically the A device 50 and the B device 60, serve as devices that have been connected to the digital multifunction peripheral 1, but the number of devices may be two or more, or may be only one device.

Also, a plurality of these devices can be used at the same time. This simultaneous usage of a plurality of devices is performed using the counter provided for each device in the first operation of the above device connection processing unit, or using the application identification ID storage area provided for each device in the second operation of the device connection processing unit.

Also, in the remote USB device usage system of the above embodiment, the digital multifunction peripheral 1 is provided with constituent elements that can fulfill all of the functions of a scanner function, a copy function, a facsimile function, and a printer function, but this is not a limitation; only constituent elements that can fulfill only some among these functions, for example, only the copy function and the printer function or only the printer function and so forth, may be provided.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A remote USB device usage system in which a client that has been connected to a network can use at least one remote USB device that is connected to a server;
    the client is connected to the server via the network;
    the client having a remote USB device connection processing unit that is capable of connecting/disconnecting the at least one remote USB device and loading a plurality of units of applications to use each of the at least one remote USB device;
    the remote USB device connection processing unit,
        when a request to connect to one of the at least one remote USB device is made from any one of the plurality of applications provided by the client, performing a check of whether or not an application other than the application that made the connection request is already using the remote USB device, and when no application is using the remote USB device, connecting to the remote USB device; and
        when a request to disconnect the remote USB device is made from any one of the plurality of applications, performing a check of whether or not an application other than the application that made the disconnection request is still using the remote USB device, and when no application is using the remote USB device, disconnecting from the remote USB device.

2. The remote USB device usage system according to claim 1, wherein the remote USB device connection processing unit:
    has a counter that is set to 0 as an initial value with respect to the plurality of applications, the counter being used to perform a check of whether or not the remote USB device is being used by an application;
    increments the counter whenever a request to connect to the remote USB device is made by any one of the plurality of applications provided by the client, and decrements the counter whenever a request to disconnect the remote USB device is made by any one of the plurality of applications provided by the client;
    when the counter changes from 0 to 1, judges that no application is using the remote USB device and performs the connection; and
    when the counter changes from 1 to 0, judges that no application is using the remote USB device and performs the disconnection.

3. The remote USB device usage system according to claim 1,
    wherein the remote USB device connection processing unit:
        whenever a request to connect to the remote USB device is made by any one of the plurality of applications provided by the client, stores application identification information that identifies the application that made the connection request;
        whenever a request to disconnect the remote USB device is made by any one of the plurality of applications provided by the client, extracts and deletes, from among the application identification information that has been stored, the application identification information that identifies the application that made the disconnection request;
        when the identification information is initially stored, judges that no application is using the remote USB device and performs the connection; and
        when all of the identification information has been deleted, judges that no application is using the remote USB device and performs the disconnection.

4. The remote USB device usage system according to any one of claims 1 to 3, wherein the server is a multifunction peripheral having at least one of a copy function, a scan function, a print function, or a facsimile function.

* * * * *